May 21, 1963            B. FATA            3,090,086
TAPERED DOVE-TAIL JOINTS
Filed July 7, 1958            2 Sheets-Sheet 1
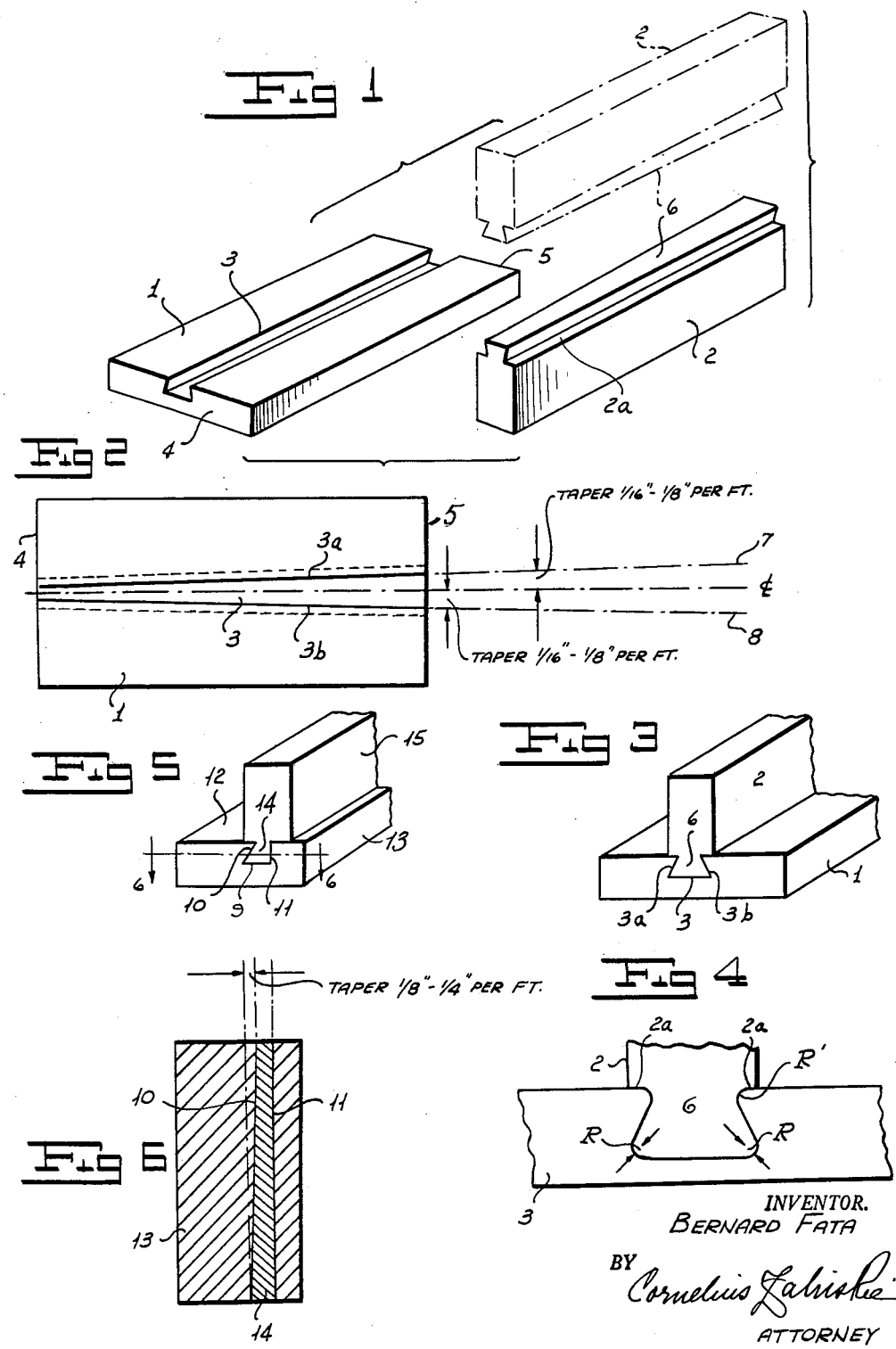
INVENTOR.
BERNARD FATA
BY Cornelius Zabriskie
ATTORNEY May 21, 1963  B. FATA  3,090,086
TAPERED DOVE-TAIL JOINTS
Filed July 7, 1958  2 Sheets-Sheet 2
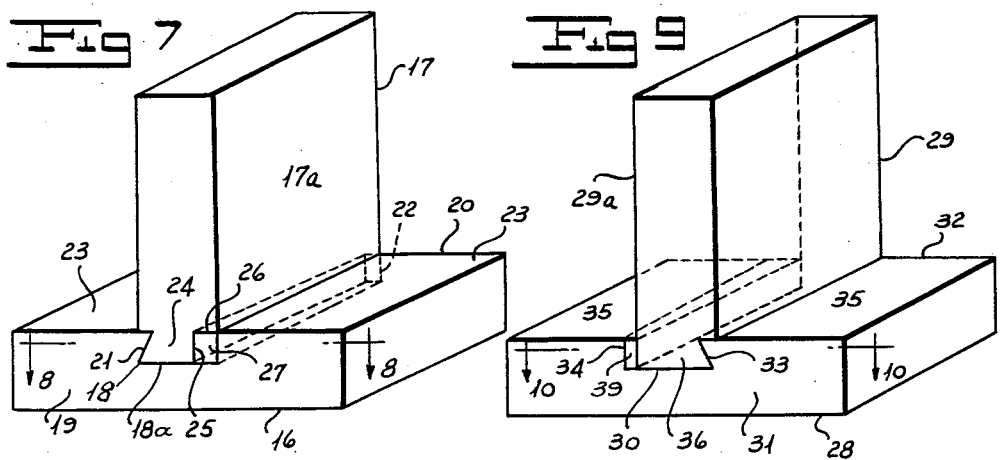
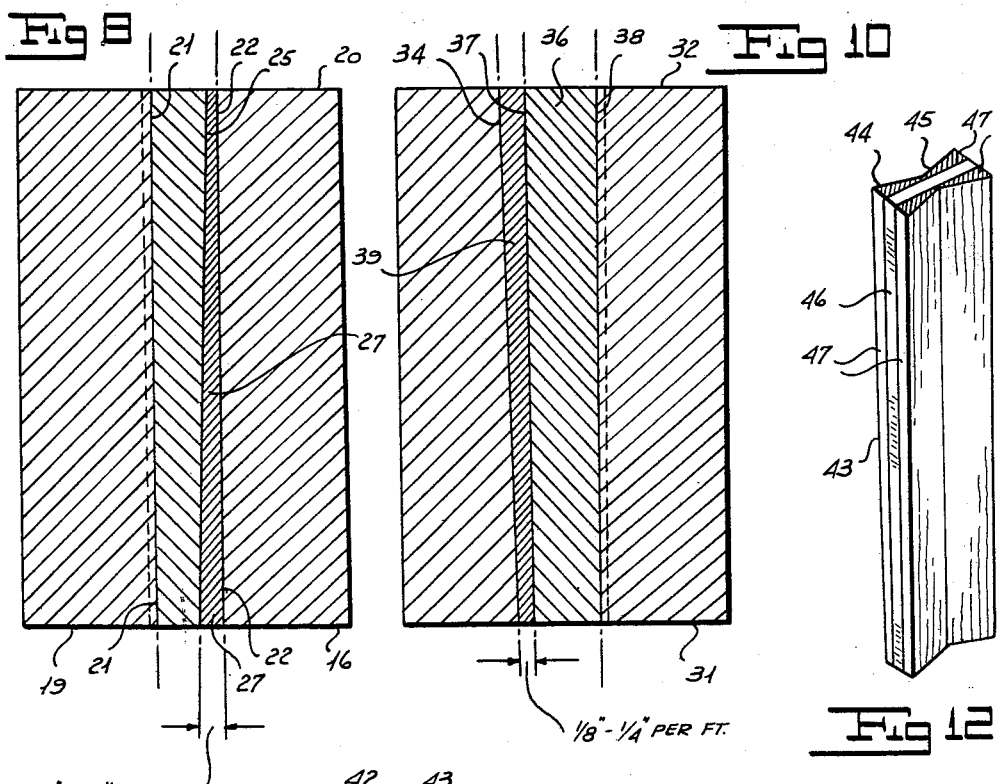
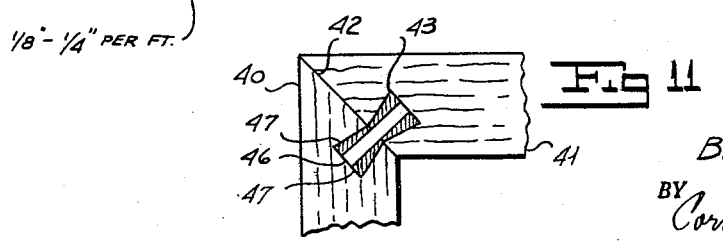
INVENTOR.
BERNARD FATA
BY
ATTORNEY United States Patent Office 3,090,086
Patented May 21, 1963

3,090,086
TAPERED DOVE-TAIL JOINTS
Bernard Fata, 56—34 61st St., Maspeth,
Long Island, N.Y.
Filed July 7, 1958, Ser. No. 747,560
4 Claims. (Cl. 20—92)

This invention relates to tapered dove-tail joints for use in cabinet wood working where particularly fine joinery is desired and where permanent glued joints are required.

Tapered dove-tail joints have heretofore been suggested and attempts have been made to commercially use them. However, they have not met with favor. For one reason or another, heretofore not understood, glued joints so made lack permanency. The glue did not hold satisfactorily and upon failure thereof, the joints tended to loosen and thus permit opening of the joints.

I have conceived and discovered that in order to make a satisfactory tapered dove-tail joint it was essential to longitudinally taper the joint within certain critical limits. I proved the effectiveness of this critical taper by many tests. I have made samples of dove-tail joints of different tapers, using different woods and I glued them with different kinds of glue. After the glue had set, I sawed these test joints in different planes to ascertain whether or not the gluing had been efficient and strong. I found that a relatively critical range of taper, in terms of fractions of an inch per foot of taper, gave highly satisfactory results in contradistinction to the failures which had previously been experienced.

In making the tests referred to, different forms of tapered dove-tail joints were used. In some tests, both the groove which constitutes the mortise and the dove-tail which constitutes the tenon were longitudinally tapered at both sides. In others, the taper was formed at one side only, while in still others the tenon was made longitudinally straight at both sides but cooperated with a tapered wedge which formed in effect a part of the tenon. The tests showed that the aggregate longitudinal taper of the tenon, whether made of one or two parts, fell within the critical range of 1/8" to 1/4" per foot in the direction of the length of the tenon. If the longitudinal taper was entirely at one side of the tenon, the angle of taper should be within this critical range, whereas if both sides of the tenon were tapered, this critical range should be divided equally at both sides of the tenon, to wit, 1/16"–1/8" per foot at each side of the tenon.

Experience has demonstrated that, when the taper is made less than the lower of these critical limits, the coacting surfaces of the joint are so nearly parallel that the bringing of the elements of the joint into interfitting relation by sliding them longitudinally with respect to one another, causes the forward edge of the entering tenon to scrape off the glue from the walls of the groove so that, by the time the tenon actually comes to its seat in the groove, there is insufficient glue left on such surfaces to properly adhere the parts. On the other hand, if the taper exceeds the upper critical limit to which I have referred, the angle is so great that lateral wedging necessary to produce proper gluing pressures is not obtained and the wedge also tends to withdraw unless it is firmly clamped by some extraneous means.

The critical taper to which I have referred permits the tenon to be introduced longitudinally into the mortise without unduly wiping off the glue from the walls of the groove and, when the tenon is forced "home," there is just the proper taper to overcome the inherent yieldability of the joint and give the necessary transverse pressure to fill the pores of the wood with glue and squeeze out excessive glue so that the actual joint surfaces are substantially in contact except for an interposed very thin pellicle of glue. When such a joint is properly made, it is practically invisible and at the same time embodies maximum strength.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

FIG. 1 is a perspective view of two members having complementary joint elements embodying the present invention, said view showing the members in different positions to more clearly show their structure and the manner in which they cooperate with one another.

FIG. 2 is a plan view of a member carrying the mortise joint element shown in FIG. 1.

FIG. 3 is a fragmental perspective showing the members of FIGS. 1 and 2 in assembled relation.

FIG. 4 is an enlarged end view of the joint of FIGS. 1–3.

FIG. 5 is a view corresponding to FIG. 3 but illustrating a modified form of the invention.

FIG. 6 is a section on the line 6—6 of FIG. 5.

FIG. 7 is a perspective view showing a further modified form of the invention.

FIG. 8 is a section on line 8—8 of FIG. 7.

FIG. 9 is a perspective view showing still another form of the invention.

FIG. 10 is a section on the line 10—10 of FIG. 9.

FIG. 11 is a fragmentary top view of two frame members meeting in a mitered joint and bound together by a dove-tail peg embodying the invention.

FIG. 12 is a perspective view of the peg shown in FIG. 11.

Referring first to FIGS. 1 to 4, inclusive, 1 and 2 designate two members which it is desired to secure together by the cabinet joint of this invention. Member 1 will, for the purpose of concrete description, be referred to as base members and 2 the upright member. The base member has an upper flat surface in which is formed a mortise groove 3 extending from one edge 4 to the opposite edge 5 of the base member. This groove 3 is undercut at its opposited sides 3a and 3b so as to be of dove-tail cross section and it is of uniform depth throughout. It is tapered in width from a lesser width at the edge 4 to a greater width at the edge 5.

The member 2 is provided with a tenon 6 complementary in every respect to the groove 3. It is of a dove-tail cross section, of uniform height and of a taper corresponding to that of the groove 3. The nature of the taper of both the groove and tenon is best shown in FIG. 2. In this view, CL designates the center line of the groove, while the projected dot and dash lines 7 and 8 are continuances of the opposite sides 3a and 3b of the groove. In situations where both sides of the grooves are tapered with respect to the center line, the taper on one side may be and preferably is the same as the taper on the other side. That is to say, the taper between each of the edges 3a and 3b of the groove and the center line CL is, according to this invention, 1/16"–1/8" per foot. Thus the combined taper of both edges aggregates 1/8"–1/4" per foot as the overall critical range of the taper of this structure and that range, either halved (as in FIGS. 1 and 2) or in the aggregate (as in FIGS. 5 and 6) is the critical range of the taper of my invention.

In making the joint according to this invention, the dove-tail groove or mortise may make sharp angles between adjacent surfaces or edges. However, I preferably form the dove-tails with rounded edges as indicated by the radius R in FIG. 4. Curved fillets R' are also preferably incorporated at the base of the dove-tail, as shown in this figure, so that the lateral surfaces of the tenon merge into the shoulders 2a of the structural member 2. When the tenon is so formed, the groove into which it is received is of course complementarily shaped. The foregoing applies not only to the structure of FIGS. 1 to 3 but to the remaining structures hereinafter described.

In FIGS. 1 to 4, both edges of both the tenon and the groove have been described as tapered, each in the order of 1/16"–1/8" per foot. In the structure of FIGS. 5 and 6, the groove 9 is of the semi-dove-tail form, that is to say, one side 10 of the groove is undercut while the opposite side 11 is sheer, i.e., in a plane approximately normal to the plane of the top surface 12 of the base 13. The tenon 14 of the up-right member 15 is complementarily shaped and both are longitudinally tapered, but only at the undercut side. Conseuently this taper will be of the order of 1/8"–1/4" per foot, as indicated in FIG. 6. The result is that the aggregate longitudinal taper of the tenon 14 in FIGS. 5 and 6 will be the same as the aggregate taper of the tenon of FIGS. 1–4 inclusive.

It is of course impractical in the drawings to show the exact angle of the taper or undercut and reliance upon this description must be had for these matters not only with respect to FIGS. 1–4, but regarding also all other figures of the drawings.

In the modified form of construction shown in FIGS. 7 and 8, the two wooden structural members 16 an 17 are arranged at right angles to one another. The base member 16 has a flat upper face 23 provided therein with an elongated groove 18 which extends from the edge 19 to the opposite edge 20. This groove is of uniform depth throughout and has only one of its longitudinal lateral surfaces 21 undercut, its opposite lateral surface 22 being sheer, i.e., normal to the base of the groove and the upper surface 23 of the base.

The upright member 17 has an elongated tenon 24 seated in the groove, one lateral surface of the tenon being complementary to and facially engaging with the undercut surface 21 of the groove. The opposite lateral surface 25 of the tenon is spaced from the corresponding lateral surface 22 of the groove and is normal to both the base 18a of the groove and the surface 23. However, as shown best in FIG. 8, this surface 25 is in longitudinal angular relation to both the surfaces 21 and 22 which are parallel to one another. Consequently the surfaces 25 and 22 converge in a direction away from the edge 19 and toward the edge 20 of the base member and this convergence conforms to the critical taper of this invention. Since the taper of the tenon is all at one side in this construction, this taper will be of the order of 1/8"–1/4" per foot.

The thickness of the upright member 17 is preferably made sufficient to cover the space between the surfaces 22 and 25. The surface 17a of said member 17 may, if desired, occupy the same plane as the surface 22 or it may overlap the upper surface 23. In any event, the member 17 carries a shoulder 26 in the plane of the surface 23. There is thus formed between the shoulder 26, the surface 22 and 25, and the base of the groove 18, a longitudinal tapering space in which is received an elongated wedge 27 shaped complementary to and closely conforming with said space and exerting a wedging action between the converging surfaces 22 and 25 to hold the tenon firmly in position in the groove and form a tight joint between the members 16 and 17.

In the embodiment of the invention shown in FIGS. 9 and 10, the base member 28 is jointed to an upright member 29. Said base member is provided with a groove 30 which extends from the edge 31 to the edge 32 of the base member. One lateral face of the groove is undercut at 33 while the other face 34 is substantially normal to the upper face 35 of the member 28. The upper member 29 has a tenon 36, one lateral face of which is dovetailed complementary to the surface 33 of the groove and is adapted to conform therewith. The thickness of the member 29, however, is less than the width of the groove 30 and the surface 29a of the upright member 29 extends uninterruptedly to the base of the groove.

As will clearly appear from FIG. 10, the tenon 36 is not tapered. Thus the surfaces 37 and 38 are spaced apart the same distance at the edge 31 as they are at the edge 32. The groove 30, however, diverges in width from the edge 31 in the direction of the edge 32, so that the surfaces 34 and 37 are in angular relation to one another thereby providing between them a tapering space which, according to the present invention, is of the order of 1/8"–1/4" per foot because the taper is all at one side of the tenon. Into this space is received a wedge 39 of corresponding taper and when this wedge is forced "home," the tenon will be locked firmly in position in a strong and neat joint.

In FIGS. 11 and 12, the invention is illustrated in a further modified form as embodying two frame members 40 and 41, abutting one another in a mitered joint 42. This joint is tied together by a pin or peg 43 shown in FIG. 12. This pin embodies in effect two identical tapered dove-tails 44 and 45 of the kind shown in FIGS. 1 to 3, and positioned, base to base. They form, collectively, a structure of substantially hourglass cross section. Each of the dove-tail elements is longitudinally tapered on both sides and consequently the taper of each side of each of them is of the order of 1/16"–1/8" per foot, as in FIGS. 1 and 2. The grooves formed in the mitered edges of the members 40 and 41 are likewise tapered in a direction normal to the plane of the drawing so that when the peg is forced "home," the mitered edges will be drawn firmly together and a good joint thereby insured.

The pin 43 may be made from one piece of wood in which the grain extends transversely of the joint to be formed. However, I may laminate the pin as indicated in the drawings—that is to say, the common central portion or lamination 46 is in the form of a flat slab of wood positioned medially of the cross section of the peg with its grain transversely of the peg and of the joint. The triangular key pieces 47, which are glued to the opposite faces of the intermediate slab 46, have wood grains which run longitudinally of the peg. With this arrangement, an extremely strong peg is produced and one which is not apt to break or give away when forced into the companion dovetail grooves on opposite sides of the mitered joint 42.

In conjunction with the showing of FIGS. 11 and 12, I have made particular reference to the grain of the wood and the direction in which it is preferably disposed in the respective parts of the structure.

In the carrying out of this invention with respect to the remaining figures of the drawings, the wood grain also plays an important part for the grain of the wood in the dove-tail should extend in the same direction as the grain in the wood of the two pieces which are united, so that as the wood of the two structural members expands and contracts in the same direction and in the same manner, the dove-tail will longitudinally expand and contract with them in like manner.

The present invention has been described as a cabinet joint. It is common in joints of this kind to permanently glue them together and the invention is peculiarly adapted for this purpose. However, because of the tapers to which I have referred, the invention is also well adapted for use in unglued joints where "knocked down" structures are involved and I wish it to be clearly understood that the invention comprehends such employment.

In the foregoing detailed description I have shown the invention in its preferred practical embodiments, but the invention is to be understod as fully commensurate with the appended claims.

This application constitutes a continuation-in-part of my prior application Serial No. 313,398, now abandoned, filed October 7, 1952, on "Tapered Dove-Tail Joints,"

which was a continuation-in-part of my application Serial No. 687,680, also now abandoned, filed August 1, 1946, on "Tapered Dove-Tail Joints."

Having thus fully described the invention, what I claim as new and desire to secure by Letters Patent is:

1. A cabinet joint for use in the manufacture of furniture and the like comprising: two wooden parts arranged in angular relation to one another, one of which is provided in one surface with an elongated mortise groove extending across the grain of the wood of said part from one edge of said surface and having a longitudinal taper of $1/8''-1/4''$ per foot and at least one side of which groove is undercut, the other part being provided in spaced relation to one of its ends with a transverse shoulder formed directly in said part, and a rigid tenon extending across the grain of the wood of and integral with said last mentioned part and projecting beyond said shoulder with at least one face of the tenon undercut to correspond with the undercut of the groove, said tenon having a taper indentical with the longitudinal taper of the groove, whereby said tenon is introducible into non-retracting, tight fitting, conforming and rigid engagement with the mortise groove without scraping the wall of the groove free from glue which may be contained therein.

2. A double dove-tail peg of wood of substantially hour-glass shape and tapered longitudinally in the order of $1/16''-1/8''$ per foot on each side of the taper, said peg embodying a flat slab of wood positioned medially of the cross section of the peg with its grain transversely of the peg, and longitudinally tapered wedge-shaped key pieces adhesively secured to the opposite faces of said slab with their grains extending generally longitudinally of the peg.

3. A joint comprising: two members one of which has a shoulder beyond which projects a tenon with a taper of the order of $1/16''-1/8''$ per foot with respect to the central axis of the tenon, the other member having a cavity closed at its bottom and constituting a mortise with the same taper and of a size snugly receiving said tenon when the joint is in completed condition with the shoulder of the mortise carrying member abutting the surface of the mortised member, and glue bonding the opposing surfaces of the joint.

4. A cabinet joint for use in the manufacture of furniture and the like comprising: two wooden parts arranged in angular relation to one another, one of which is provided in one surface with a mortise having a taper of $1/8''-1/4''$ per foot, the other part being provided in spaced relation to one of its ends with a transverse shoulder formed directly in said part, and a rigid tenon integral with said last mentioned part and projecting beyond said shoulder, said tenon having a taper identical with the taper of the mortise, whereby said tenon is introducible into non-retracting, tight-fitting, conforming and rigid engagement with the mortise without scraping the wall of the groove free from glue which may be contained therein.

References Cited in the file of this patent

UNITED STATES PATENTS

| | | |
|---|---|---|
| 713,679 | Pfeil et al. | Nov. 18, 1902 |
| 1,687,671 | June | Oct. 16, 1928 |
| 1,954,242 | Heppenstall | Apr. 10, 1934 |
| 2,300,937 | Lahti | Nov. 3, 1942 |
| 2,331,752 | Wilson | Oct. 12, 1943 |

FOREIGN PATENTS

| | | |
|---|---|---|
| 3,146 | Great Britain | Dec. 14, 1861 |